United States Patent [19]
Daku

[11] Patent Number: 5,433,612
[45] Date of Patent: Jul. 18, 1995

[54] ELECTRONIC ACCOUNTABILITY SYSTEM

[75] Inventor: Hartley Daku, White City, Canada

[73] Assignee: Commandl Systems, Inc., White City, Canada

[21] Appl. No.: 337,505

[22] Filed: Nov. 8, 1994

[51] Int. Cl.⁶ .............................................. G09B 9/00
[52] U.S. Cl. ................................... 434/226; 434/219
[58] Field of Search ............... 434/219, 218, 224, 226, 434/430

[56] References Cited

U.S. PATENT DOCUMENTS

| | | |
|---|---|---|
| 2,605,342 | 7/1952 | Spurling . |
| 5,031,160 | 7/1991 | Koizumi et al. . |
| 5,219,290 | 6/1993 | Lapp et al. . |
| 5,227,776 | 7/1993 | Starefoss . |
| 5,266,033 | 11/1993 | Rogers et al. .................. 434/226 |
| 5,326,270 | 7/1994 | Ostby et al. ................. 434/219 X |
| 5,344,324 | 9/1994 | O'Donnell et al. ........... 434/219 X |
| 5,374,191 | 12/1994 | Herman et al. ................. 434/226 |

Primary Examiner—Richard J. Apley
Assistant Examiner—Glenn E. Richman

[57] ABSTRACT

An electronic accountability apparatus for use by an incident manager in the timing and tracking of multiple teams of personnel and equipment, such as in a fire fighting operation. The apparatus includes a timing system for tracking and selecting active teams and timing their task times, including monitoring the use of supplementary breathing apparatus as required. The apparatus also includes a tracking system to monitor the movement of active teams through various zones of a building, including the ability to determine the hazardous or hot zones, the current location of active teams, and the past locations of current teams. The data that is generated from the above "events" such as active team assignments, time in intervals, zone movement etc. are all stored in the battery backed up RAM that can be downloaded to a personnel computer to provide a complete history of the operation.

8 Claims, 4 Drawing Sheets

ELECTRONIC ACCOUNTABILITY SYSTEM

FIELD OF THE INVENTION

This invention relates to the field of electronic accountability systems, and more particularly to emergency incident control systems for organizing and tracking multiple units of hazard fighting personnel and equipment.

BACKGROUND OF THE INVENTION

Fire department and other hazard controlling agencies require a flexible command structure to respond to many different situations. For example, command personnel of a fire department must have the capability to respond to situations ranging from a small fire that can be controlled by a single unit of equipment and crew, to a large scale fire that may require many units of equipment and crews from different departments within an agency and even from different agencies. The basic organization and command line of an agency responding to an incident such as a fire is essentially the same for all emergency incidents, small and large.

An individual referred to as the incident commander is required to direct and manage the operation generally at the site to ultimately gain control of the incident and bring it to a conclusion. A small incident requiring only the deployment of one or two units is relatively uncomplicated. For a small incident the incident commander is generally the supervisor of the first unit to arrive at the scene and assumes the role of directing the units assigned to that site, assigning particular assignments to the units and corresponding crew members. The incident commander having only to manage and direct one or two units can do so without a great deal of organizational concern.

Large scale incidents that require multiple units of equipment and corresponding crews of personnel magnify the organizational concerns of the incident commander. The more equipment required and involved to combat an incident, the more complex the management. Each equipment unit called into service has personnel assigned to the unit and the incident commander assigns the unit and its corresponding crew to a task. The incident commander makes the job assignment and keeps track of the deployment of teams and apparatus. Other agencies, both private and public, may also be employed and they too come under the overall organizational responsibilities of the incident commander.

In order for the incident commander to effectively manage numerous amounts of equipment and personnel involved in a plurality of tasks in a multi-alarm fire, for example, the incident commander needs a tool that will provide ready information of the operation.

Various manual "board" type command systems have been proposed in the prior art, such as in U.S. Pat. No. 5,219,290 issued Jun. 15, 1993 to Lapp et al. The Lapp et al. patent discloses a tool for use by an incident manager and involves the use of tags and various graphics to control the operation of teams and tasks during an incident operation.

The disadvantage of such systems is that they are unable to store information about the operation for later analysis. In particular, important information about team/assignments and movements to provide a historical record of the operation is not readily obtainable from the these manual systems. In addition, the accurate task times of multiple teams in service is difficult to accomplish using manual board type systems.

Personnel computer based incident managers using specialized software have been proposed in the prior art. However, they are generally unsuitable for complex, fast moving operations, because of the small screen size, which makes it difficult to assess the status of an incident in a glance, and complex controls that render them functionally limited in high stress command situations.

Consequently, it would be desirable to provide an electronic accountability apparatus that will enable an operations history to be downloaded from the apparatus to review the details of the operation. In addition, it would be desirable to provide an apparatus that enables the incident commander to quickly assess the status of the situation by ensuring that all necessary data of the operation is available visually without the need to refresh a number of screens.

SUMMARY OF THE INVENTION

An object of the present invention is to provide an electronic accountability apparatus to enable an incident commander to have better control of his personnel and equipment resources.

Another object of the present invention is to provide an electronic accountability apparatus that will enable an operations history to be downloaded from the apparatus to review and analyze the details of a particular operation.

In accordance with one aspect of the invention there is provided an electronic accountability apparatus for use by an incident manager in the timing and tracking of multiple teams of personnel and equipment at a location having a plurality of zones comprising: (a) a timing system including: memory means for storing a list of team designations and task designations; means for selecting a plurality of active teams from the list of team designations and an active task for each of the active teams from the list of task designations; first counting means for counting a team time interval for each of the active teams when performing the active task and for producing team time interval data; second counting means for counting a use time interval for use of a self-contained breathing apparatus for each of the active teams and for producing use time interval data; means for prescribing a minimum time interval limit for use of the self-contained breathing apparatus for each of the active teams; and display means for displaying the plurality of active teams and the active task for each one of the active teams, the team time interval data, the use time interval data, and the minimum time interval limit; (b) a tracking system including; a plurality of displays each representing one of said zones, and each said display being adapted to provide (i) a visual display indicating that a given zone has been identified as a hazardous zone, (ii) a visual display indicating that a given zone is being occupied by one of the active teams, and (iii) a visual display indicating that a given zone had been occupied by one of the active teams; and means for producing zone time interval data for each of the active teams when performing the active task in a given zone; means for producing hazardous zone data for each of the plurality of displays; and (c) data storage means for storing the plurality of active teams and the active task for each one of the active teams, the team time interval data, the use time interval data, the minimum time interval limit, the zone time interval data, and the hazardous zone data.

BRIEF DESCRIPTION OF THE DRAWINGS

An embodiment of the invention will be described by way of example in conjunction with the drawings in which.

DETAILED DESCRIPTION OF AN EMBODIMENT OF THE INVENTION

Figure 1:
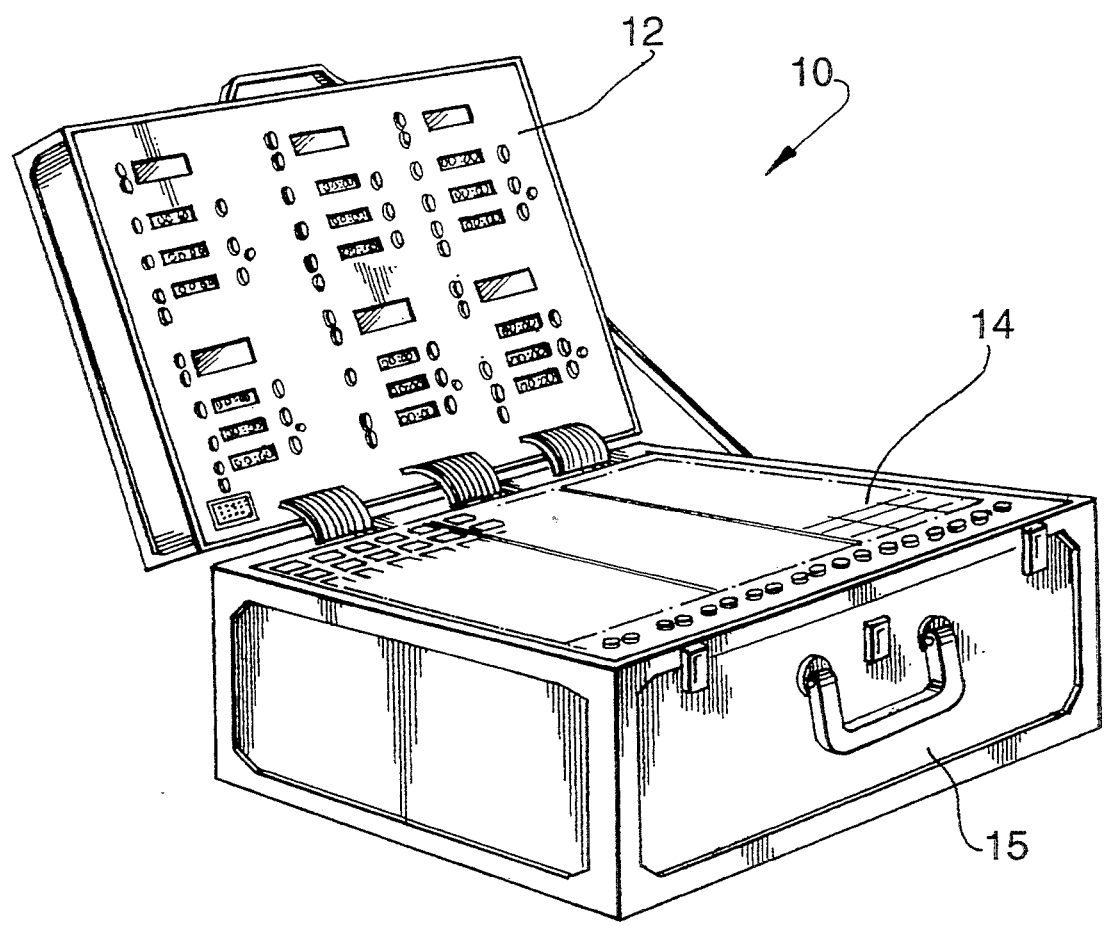
FIG. 1 illustrates a perspective view of an electronic accountability apparatus according to the present invention.

FIG. 1 illustrates a schematic representation of an electronic accountability apparatus 10 according to the present invention. The accountability apparatus 10 includes two main components: a timing system 12 and a tracking system 14 stored in an aluminum clad case 15.

Figure 2:
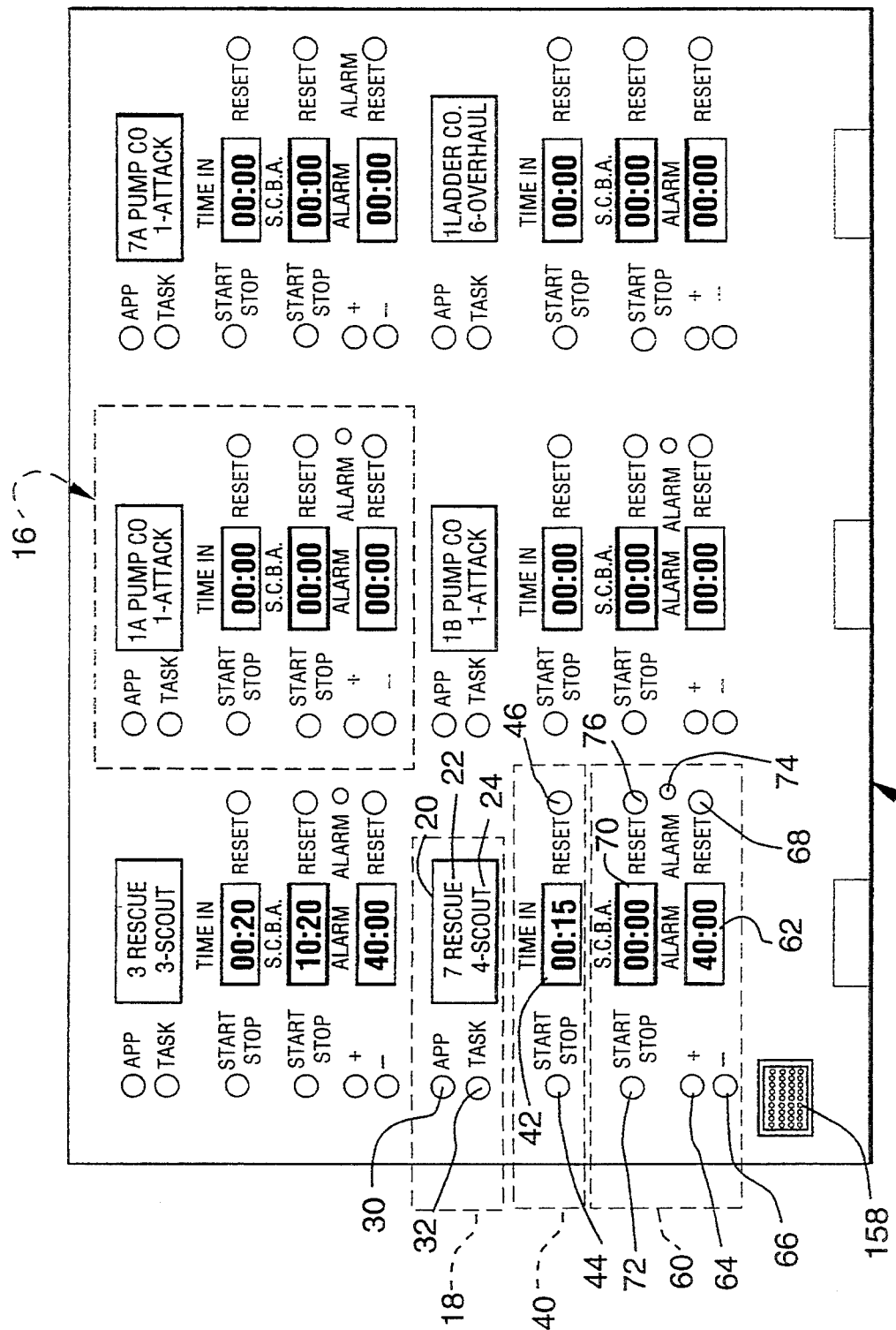
FIG. 2 illustrates a plan view of the timing system of the apparatus shown in FIG. 1.

Referring to FIG. 2, the timing system 12 is divided into six team control sections 16, each section 16 being used to control the operations of a single team at any given time. Each team section 16 includes a team/task identification section 18. The identification section 18 includes a two line by 16 character liquid crystal display (LCD) 20 for displaying a team/apparatus designation 22 (e.g. 7 RESCUE) and a task designation 24 (e.g. 4 SCOUT) assigned to the team 22. A complete list of preprogrammed team 22 and task 24 designations are stored in memory, which will be discussed in detail in conjunction with FIG. 4.

The team 22 and task 24 designations can be scrolled onto the display 20 one line at a time by pushing the apparatus display advance button 30, and the task display advance button 32, respectively.

Each team section 16 includes a team time-in section 40 having a four digit timing LCD 42 to display the total cumulative time the team 22 has been in service performing task 24 (i.e. the team 22 time interval limit). The timing display 42 is controlled by a start/stop button 44 for starting and stopping the displayed time, and a reset button 46 for resetting the display 42 to 00:00 minutes when a new team is deployed to perform a task, or when the same team 22 is deployed to perform a new task.

Each team section 16 includes a self-contained breathing apparatus (SCBA) control section 60 to establish and monitor the amount of supplementary air the members of team 22 have remaining during the function of the task 24. An alarm display 62 is used to set the alarm time, i.e. the minimum time interval limit for use of supplementary air available to the members of team 22. The time shown in display 62 is incremented or decremented by pressing either a plus(+) button 64 or a minus(-) button 66. A reset button 68 is used to zero the alarm display 62.

When the alarm time is established on the alarm display 62, a SCBA countdown timer display 70 initially shows the same time. A start/stop button 72 will initiate or terminate the count down of the SCBA timer 70 in minutes and seconds to display the use time interval limit for use of SCBA. When the SCBA timer 70 reaches a predetermined time (i.e. 10 minutes), a short alarm tone is generated to alert the operator that the team 22 has a limited amount of time remaining on their SCBA.

When the SCBA timer 70 reaches 00:00 minutes, a continuous audible alarm is sounded and an alarm LED 74 is illuminated indicating that the designated team 22 has exhausted the supply of supplementary air provided by the SCBA. The alarm LED 74 is reset by pressing the reset button 68.

Resetting the alarm display 62 using reset button 68 forces the operator to reprogram the alarm display 62 with the appropriate time for a new team. A reset button 76 is provided to reset the SCBA timer 70 at any time after the timer 70 has been stopped, but will not silence the audible alarm.

Figure 3:
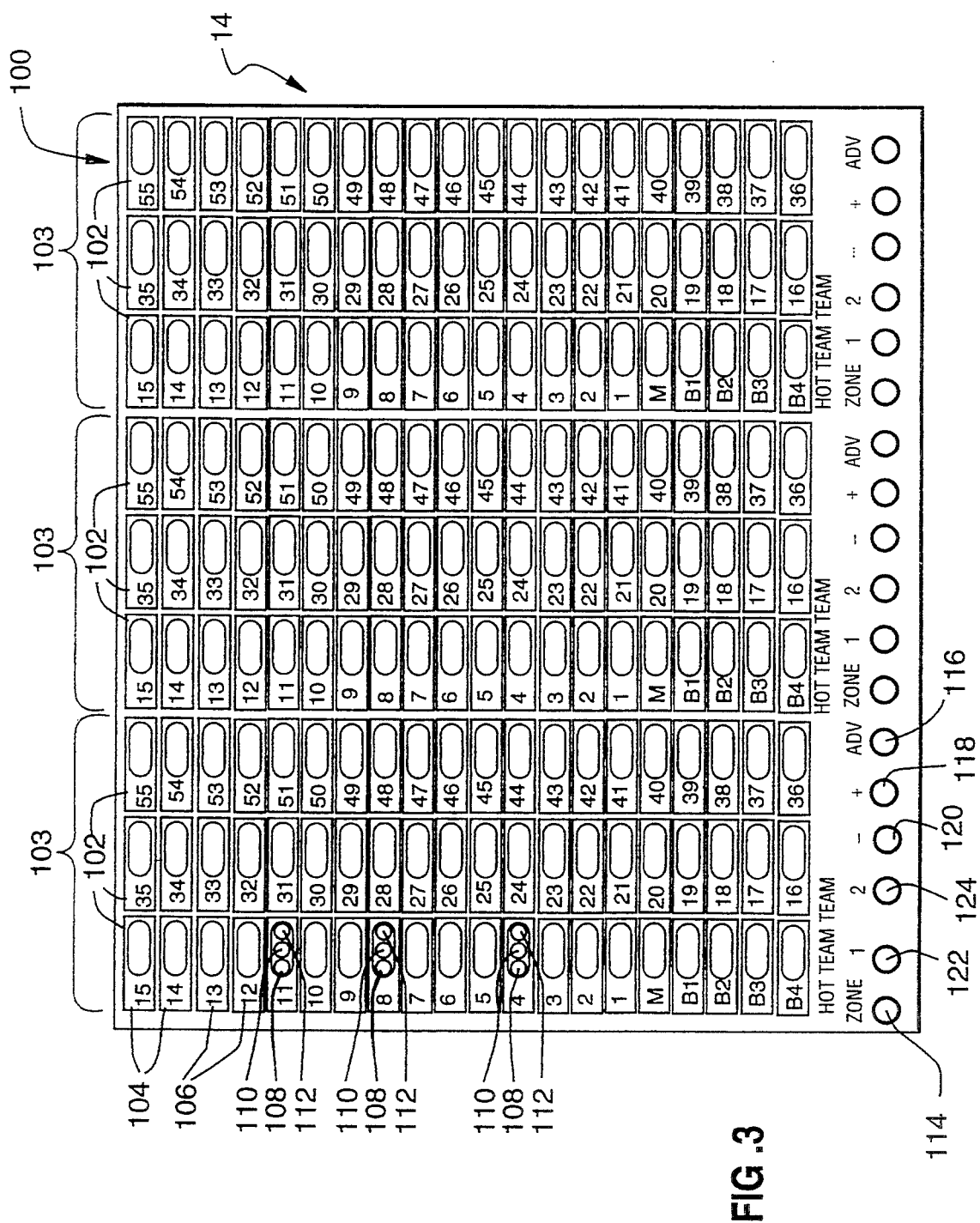
FIG. 3 illustrates a plan view of the tracking system of the apparatus shown in FIG. 1.

Referring to FIG. 3, the tracking system 14 includes a floor/zone tracking display 100 consisting of nine columns 102 divided into three 2-team sections 103. Each column 102 includes 20 LED sections 104. The display 100 can represent floors in a highrise building or zones in a warehouse complex, for example. Each LED section 104 includes a numeral floor/zone indicator 106, and three colored LEDs 108 (red), 110 (green), and 112 (yellow).

LED 108 is designated as the hot zone indicator to indicate that a given floor/zone is "hazardous/hot" i.e. active with fire etc. LED 110 is designated as the "Team 1" indicator and when flashing represents the current location of the team designated as "Team 1", and when solid represents the prior location of the team designated as "Team 1".

LED 112 is designated as the "Team 2" indicator and when flashing represents the current location of the team designated as "Team 2" and when solid represents the prior location of the team designated as "Team 2".

The three 2-team sections 103 of the tracking display 100 correspond to the three columns of team control sections 16 of the timing system 12. The six teams in the timing system 12 are matched to three distinct sets of "Team 1" and "Team 2" designations in the tracking system 14. Therefore, the control section 16 in the upper left of timing system 12 is designated as "TEAM 1" in the left section 103 of the tracking system 14.

The section 16 in the lower left of timing system 12 is designated as "TEAM 2" in the left section 103 of the tracking system 14. Other team pairs on the tracking system 14 are similarly related to the control sections 16 of the timing system 12.

The hot zone LED 108 is controlled by pressing and releasing a hot zone control button 114, and then pressing and holding an advance button 116. While holding the advance button 116, the plus (+) 118 or minus (−) 120 button is pressed to move the hot zone LED 108 incrementally through the LED sections 104 until the desired floor/zone indicator 106 is reached. The advance button 116 is then released to permanently indicate the hot zone with the red LED 108 in flashing mode. The same procedure is repeated to "mark" other hot zones.

The "Team 1" LED 110 is set by pressing and releasing a team 1 button 122, and then pressing and holding the advance button 116. While holding the advance button 116, the plus (+) 118 or minus (−) 120 button is pressed to move the "Team 1" LED incrementally through the LED sections 104 until the desired floor/zone indicator 106 is reached. The advance button 116 is then released and the current floor/zone 106 is indicated by the team 1 LED 110 in flashing mode.

As the team 22 advances from one floor/zone 106 to the next, the floor/zone 106 that has been cleared will be marked by the "Team 1" LED in solid mode, and their current position marked by the "Team 1" LED in flashing mode.

The time that a given team is active in a certain zone is the zone time interval and is stored in a memory component (discussed in conjunction with FIG. 4) of the apparatus 10 based on the information obtained from the events of the tracking system 14.

The "Team 2" LED 112 is set in the same manner as that described in conjunction with LED 110 with the exception that the "Team 2" LED 112 is yellow, and is set using a team 2 button 124.

When the team 22 completes their assigned task 24 and has safely moved from the scene, the team LEDs 110, 112 are turned off by holding the advance button 116 and the minus(−) button 120 sequentially through the lit floor/zone indicators 106 until all of the LEDs for the removed team are turned off.

Figure 4:
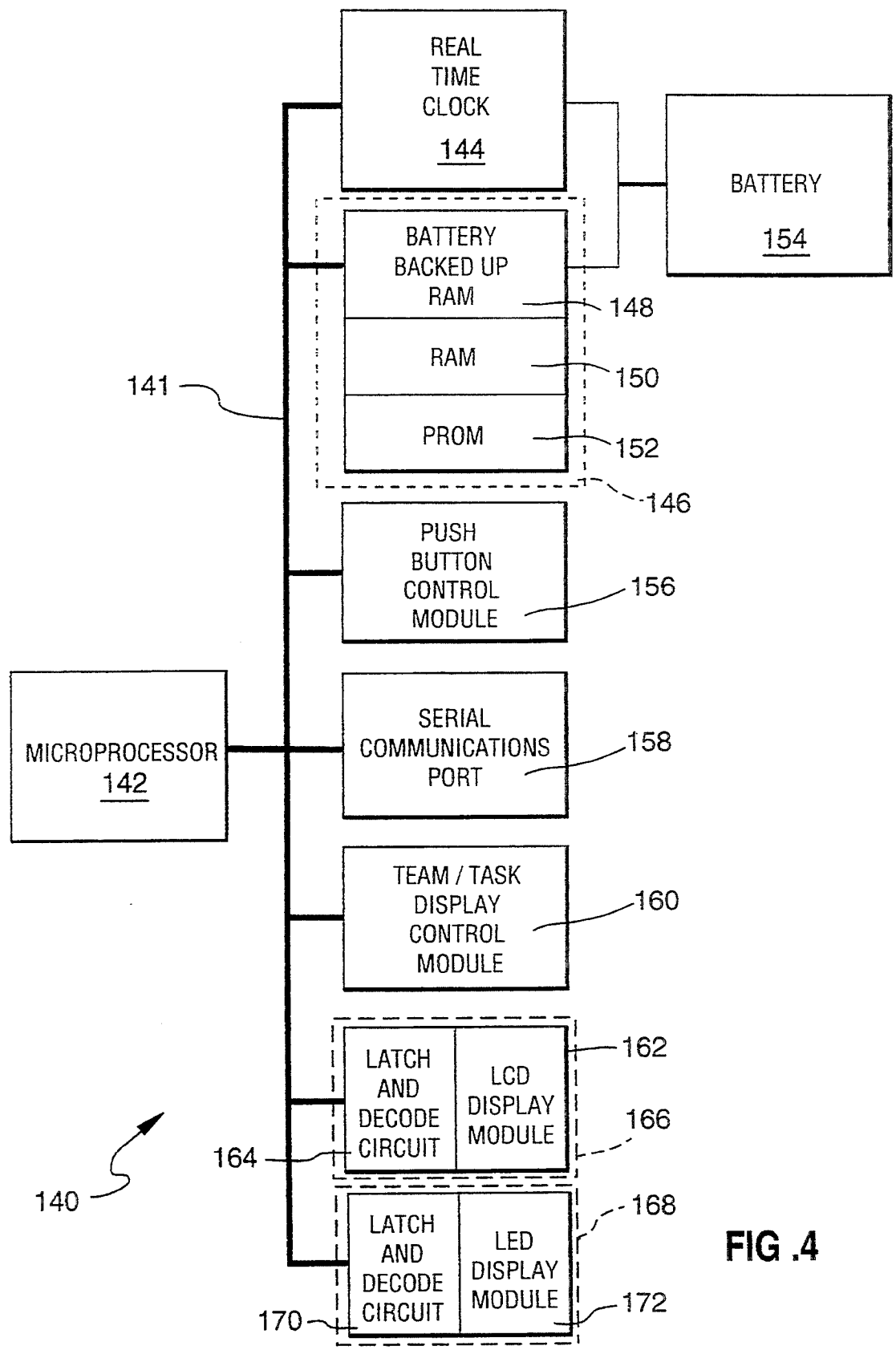
FIG. 4 illustrates a block diagram configuration of the circuit system of the apparatus shown in FIG. 1.

The operation and storage of event and time data of the accountability apparatus 10 is electronically controlled by the circuit system 140 as illustrated in block diagram form in FIG. 4. The circuit system 10 includes a microprocessor 142 that communicates with other components of the system 140 through an address and control bus 141.

A real time clock 144 provides the microprocessor 142 with current date and time information. This information is transferred to the microprocessor via the bus 141 and is updated once per second.

A memory module 146 includes a battery backed up Read Only Memory (RAM) section 148; a volatile RAM section 150 and a Programmable Read Only Memory (PROM) section 152.

The RAM section 148 is used to store the occurrence of any operator input to the apparatus 10. For example, any time one of the timer sections 40 or 60 are started or stopped, or when the status of an LED on the tracking display 100 is changed, the microprocessor stores the necessary information in the battery backed up RAM 148 for future download to a personal computer (not shown) and the like.

The volatile RAM section 150 is used for temporary storage of current times for all timer sections 40 and 60, and for stacks and miscellaneous working memory for the microprocessor 142.

The PROM section 152 provides permanent read-only information to the microprocessor 142 relating to team 22 and task 24 designations to be displayed in display 20, and information on how to scan all the push buttons (for example, 30, 32, 64, 122 etc.) located on the timing system 12 and tracking system 14.

A battery 154 supplies continuous power to the clock 144 and to the RAM section 148 to maintain operation even when the apparatus 10 is turned off.

All of the push buttons in the apparatus 10 are connected to the microprocessor 142 via the bus 141 through a push button control module 156.

For example, apparatus display advance button 30, start/stop buttons 44 and 72, hot zone button 114 etc. are in electrical communication with the microprocessor 142. The microprocessor 142 responds to push button requests with the appropriate action based on the logic programmed into the PROM 152.

A serial communications port 158 allows the microprocessor 142 to transmit serial data to a personal computer via its serial communications port for permanent storage and analysis of the data that was stored in the RAM 148 during an incident.

A team/task display control module 160 is used to communicate with the display 20 to display the appropriate team/apparatus designation 22 and task designation 24. The data used in the module 160 is stored in the PROM 152 and is communicated from the microprocessor 142 via the bus 141.

A timing system control module 162 includes a latch/decode circuit 164 and an LCD display module 166. The latch/decode circuit 164 communicates via the bus 141 with the microprocessor 142 to control the operations of the display module 166. The display module 166 drives the seven segment timing displays 42, 62 and 70 located in the timing system 12 portion of the apparatus 10.

A tracking system control module 168 includes a latch/decode circuit 170 and LED display module 172. The latch/decode circuit 170 communicates via the bus 141 with the microprocessor 142 to control the operations of the display module 172. The display module 172 drives the columns of LEDs 102 located in the tracking system 14 portion of the accountability apparatus 10.

EXAMPLE

The following example illustrates the use of the electronic accountability apparatus 10 for a typical fire fighting situation involving a low-rise four story apartment complex.

The apparatus 10 is customized to a specific agency. In this example, the PROM 152 is preloaded with the following apparatus/team designations, and task designations:

Apparatus/Team Designations

1A Pump Co.   3 Rescue Co.
1B Pump Co.   7 Rescue Co.
2A Pump Co.   7 HazMat
2B Pump Co.   1 Ladder
3A Pump Co.   4 Ladder
4A Pump Co.
6A Pump Co.
7A Pump Co.

Task Designations

Attack
E.M.S.
Scout
Water Rescue
Search/Res.
Recon.
Ventilation
Decon.
Evacuation
Transportation Command Particulars (a) The incident commander reviews the situation and will initially set one or more hot zone LEDs 108 in the tracking system 14 portion of the apparatus 10 using the hot zone control button 114 as previously described. In the present example, the third floor is indicated as being the hot/hazard (fire) zone.

(b) The commander then selects team "7 RESCUE Co." as the active team and the "SCOUT" task as the active task for the active team. This is entered into the timing system 12 portion of the apparatus 10 by using the apparatus and task display advance buttons 30, 32 until the desired team and task are displayed in display 20.

(c) The team leader for "7 RESCUE Co." will communicate with the commander by short-wave radio to indicate that they have begun the scouting task. For example, as the team "7 RESCUE Co." moves from floor to floor, they radio their location to the commander and the team 1 LED 110 is set to a flashing mode using team 1 button 122 as previously described. When the team moves from the first floor to the second floor, the incident commander will set team 1 LED 110 in floor 1 to solid green and the LED 110 of floor 2 is set to flashing mode.

(d) During the scouting operation the team may be required to use their breathing apparatus. They would indicate their intentions to the incident commander as follows: "3 rescue scout to command—we are charging air". At this point the minimum time interval limit of air charge is loaded into the display 62 and the SCBA countdown timer 70 is started. Appropriate audible and visual warnings are provided so that the team can be replaced with a backup team as previously described in conjunction with FIG. 2.

(e) The scouting team encounters a fire on the third floor. The commander dispatches the "1A PUMP Co." team to the "ATTACK" task. This team and task selection is entered into the timing system 12 in a distinct team/task control section 16. The commander would mark team 2 in floor 3, as represented by a flashing yellow LED 112; start the time in timer 42; and load and start the SCBA timer 70, as required.

(f) After the scouting team has scouted the four floors and is out of the building, the timer 42 is stopped and the corresponding tracking LEDs 110 (all solid green) are turned off as previously described in conjunction with FIG. 3.

(g) Similarly the active attack team (1A PUMP Co.) puts out the fire leaves the building and is removed from the tracking system 14.

In all of the above steps (a)–(g) the various "event" data, such as active team and task selections, team interval data, SCBA use interval data, team movement etc. is recorded in the RAM section 148 of the circuit system 140.

In more complex situations, the commander will continue to deploy teams having assigned tasks and monitor their movements as described above. The apparatus 10 is capable to tracking 6 teams; however, adding additional team tracking ability is just a matter of scale.

To review the historical data of input entered into the accountability apparatus by the incident commander, data is downloaded from the RAM section 148 through port 158. The information from the above operation, including real time data, is summarized in tables A and B.

TABLE A

TEAM 1 DOWNLOAD SHEET

| TEAM I.D. | 7 RESCUE SCOUT | | | |
|---|---|---|---|---|
| ASSIGNMENT | SCOUT | | | |
| TIME IN | 8:30 | | | |
| TIME OUT | 9:10 | | | |
| TOTAL ASSIGNED TIME (TEAM TIME INTERVAL DATA) | 0:40 | | | |
| S.C.B.A. TANK SIZE (MINIMUM TIME INTERVAL LIMIT) | 0:20 | | | |
| S.C.B.A. ON | 8:50 | | | |

TABLE A-continued

TEAM 1 DOWNLOAD SHEET

| TEAM I.D. | 7 RESCUE SCOUT | | | |
|---|---|---|---|---|
| S.C.B.A OFF | 8:58 | | | |
| S.C.B.A AIR USED | 0:08 | | | |
| FLOOR/ZONE NUMBER | 1 | 2 | 3 | 4 |
| TIME IN | 8:30 | 8:40 | 8:50 | 8:59 |
| TIME OUT | 8:35 | 8:45 | 8:57 | 9:07 |
| FLOOR/ZONE TIME (ZONE TIME INTERVAL DATA) | 0:05 | 0:05 | 0:07 | 0:08 |
| HOT ZONE LOCATION | 3 | | | |
| INCIDENT TERMINATION TIME | 10:35 | | | |

TABLE 2

TEAM 2 DOWNLOAD SHEET

| TEAM I.D. | 1A PUMP CO. |
|---|---|
| ASSIGNMENT | ATTACK |
| TIME IN | 8:58 |
| TIME OUT | 9:25 |
| TOTAL ASSIGNED TIME (TEAM TIME INTERVAL DATA) | 0:27 |
| S.C.B.A. TANK SIZE (MINIMUM TIME INTERVAL LIMIT) | 0:20 |
| S.C.B.A. ON | 8:58 |
| S.C.B.A OFF | 9:18 |
| S.C.B.A AIR USED | 0:20 |
| FLOOR/ZONE NUMBER | 3 |
| TIME IN | 8:58 |
| TIME OUT | 8:25 |
| TOTAL FLOOR/ZONE (ZONE TIME INTERVAL DATA) | 0:27 |
| HOT ZONE LOCATION | 3 |
| INCIDENT TERMINATION TIME | 10:35 |

As tables A and B clearly illustrate the historical data of the entire incident of the example that was recorded in the RAM section 148 can be downloaded via port 158 to a personal computer where it can be printed and reviewed.

This type of historical data can be used in many ways, for example, (a) as a training/teaching exercise to review the actions of teams during a particular incident in an effort to improve performance etc.; (b) as concrete proof that a particular team was in a particular location for a prescribed period of time, in the event that questions are raised subsequent to the operation about ineffective rescue operations for example.

I claim:

1. An electronic accountability apparatus for use by an incident manager in the timing and tracking of multiple teams of personnel and equipment at a location having a plurality of zones comprising:
   (a) a timing system including:
      memory means for storing a list of team designations and task designations;
      means for selecting a plurality of active teams from the list of team designations and an active task for each of the active teams from the list of task designations;
      first counting means for counting a team time interval for each of the active teams when performing the active task and for producing team time interval data;

second counting means for counting a use time interval for use of a self-contained breathing apparatus for each of the active teams and for producing use time interval data;

means for prescribing a minimum time interval limit for use of the self-contained breathing apparatus for each of the active teams; and display means for displaying the plurality of active teams and the active task for each one of the active teams, the team time interval data, the use time interval data, and the minimum time interval limit;

(b) a tracking system including;

a plurality of displays each representing one of said zones, and each said display being adapted to provide (i) a visual display indicating that a given zone has been identified as a hazardous zone, (ii) a visual display indicating that a given zone is being occupied by one of the active teams, and (iii) a visual display indicating that a given zone had been occupied by one of the active teams; and means for producing zone time interval data for each of the active teams when performing the active task in a given zone;

means for producing hazardous zone data for each of the plurality of displays; and (c) data storage means for storing the plurality of active teams and the active task for each one of the active teams, the team time interval data, the use time interval data, the minimum time interval limit, the zone time interval data, and the hazardous zone data.

2. The apparatus of claim 1, further including a signal means for indicating that the use time interval has attained a predetermined value of the minimum time interval limit.

3. The apparatus of claim 2, wherein the signal means includes an audible signal.

4. The apparatus of claim 2, wherein the signal means includes a visual indicating means.

5. The apparatus of claim 1, further including means for transferring contents of the data storage means to a remote receiving source.

6. The apparatus of claim 5, wherein the means for transferring includes a serial communications port.

7. The apparatus of claim 1, wherein the display means are liquid crystal displays.

8. The apparatus of claim 1, wherein the visual displays are light emitting diodes.

* * * * *